United States Patent [19]
Oyama et al.

[11] Patent Number: 6,113,496
[45] Date of Patent: Sep. 5, 2000

[54] VIBRATION BUFFERING DEVICE

[75] Inventors: Kazuo Oyama; Kazuyuki Kishi, both of Saitama, Japan

[73] Assignee: Honda Giken Kogyo Kabushiki Kaisha, Tokyo, Japan

[21] Appl. No.: 09/196,443

[22] Filed: Nov. 20, 1998

[30] Foreign Application Priority Data

Nov. 28, 1997 [JP] Japan .................................. 9-327313

[51] Int. Cl.⁷ ..................................................... F16D 3/12
[52] U.S. Cl. ............................ 464/68; 464/98; 192/213.2
[58] Field of Search ................................... 267/167, 168, 267/179, 174; 192/213.1, 213.2; 74/574; 464/64, 65, 68, 98, 99

[56] References Cited

U.S. PATENT DOCUMENTS

| | | | |
|---|---|---|---|
| 3,245,229 | 4/1966 | Fadler | 464/90 |
| 4,533,338 | 8/1985 | Hamada | 464/64 |
| 4,548,311 | 10/1985 | Lech, Jr. | 192/106.2 |
| 4,904,225 | 2/1990 | Worner et al. | 464/67 |
| 5,163,875 | 11/1992 | Takeuchi | 464/64 |
| 5,218,884 | 6/1993 | Rohrle | 74/574 |
| 5,380,248 | 1/1995 | Kraus et al. | 464/66 |
| 5,857,914 | 1/1999 | Matsuoka | 464/64 |
| 5,882,264 | 3/1999 | Yabe et al. | 464/64 |
| 5,971,857 | 10/1999 | Friedmann et al. | 464/24 |

FOREIGN PATENT DOCUMENTS

| | | |
|---|---|---|
| 5-180266 | 7/1993 | Japan . |
| 7-71526 | 3/1995 | Japan . |

*Primary Examiner*—Robert J. Oberleitner
*Assistant Examiner*—Lan Nguyen
*Attorney, Agent, or Firm*—Arent Fox Kintner Plotkin & Kahn, PLLC

[57] ABSTRACT

A vibration buffering device is constructed in a lightweight and compact fashion, the number of parts is reduced, the assembling operation can be simplified, and generation of a noise is prevented. An annular passage and accommodating recesses, which open into the passage in pairs, are defined in a damper housing integral with a first mass member. First coil springs are retained on spring holders inserted in the passage, and second coil springs are accommodated in the accommodating recesses. A transmitting arm, placed into the passage, is coupled to a second mass member which is capable of being angularly displaced about the same axis relative to the first mass member. In a power non-transmitting state, opposite ends of the second coil springs are received by opposite ends of the accommodating recesses and are in contact with opposite ends of the spring holders. When a relative angular displacement is produced between both the mass members, the transmitting arm is turned relative to the damper housing, while compressing the first coil springs, so as to come into abutment against one end of the second coil springs.

6 Claims, 7 Drawing Sheets

VIBRATION BUFFERING DEVICE

FIELD OF THE INVENTION

The present invention relates to a vibration buffering device which is mounted between a prime mover and a power transmitting device in order to transmit power from the prime mover to the power transmitting device, and in particular, to a vibration buffering device capable of exhibiting a multi-stage vibration buffering characteristic.

BACKGROUND OF THE INVENTION

Vibration buffering devices are conventionally known, for example, from Japanese Patent Application Laid-open Nos. 7-71526 and 5-180266.

The vibration buffering device disclosed in Japanese Patent Application Laid-open No. 7-71526 includes a plurality of first coil springs, and a plurality of second coil springs. The plurality of second coil springs are formed into an arcuate shape about the rotational axes of first and second mass members and are disposed outside the first coil springs in a radial direction of the mass members. It is required that an intermediate member, for operating the first and second coil springs having different operational radii in operative association with each other, bentegrated therewith since the load balance is lost if the intermediate member is divided. Hence, an increase in size cannot be avoided. If the distribution of end face loads of the first and second coil springs is taken into consideration, the intermediate member is obliged to be formed into a three-layer structure, resulting in an increase in number of parts. Moreover, a caulking pin or the like is required in order to provide the integrated three-layer structure, which also results in an increased number of parts and in a complicated assembling operation.

In the vibration buffering device disclosed in Japanese Patent Application Laid-open No. 5-180266, the first and second coil springs are disposed in series in an arcuate configuration about the rotational axes of the first and second mass members. The spring load of the second coil spring is set larger than that of the first coil spring. However, the weight of the second coil spring is relatively large. If a preload corresponding to the weight is not applied to the second coil spring, the second coil spring moves to produce a noise. However, since the first and second coil springs are connected in series, if a large preload is applied to the second coil spring, a preload applied to the first coil spring is also large, whereby the vibration buffering effect is degraded.

SUMMARY OF THE INVENTION

The present invention has been accomplished with the problems described above in mind. It is therefore an object of the present invention to provide a vibration buffering device which is constructed in a lightweight and compact fashion, so that the generation of a noise can be prevented, the number of parts can be reduced, and the assembling operation can be simplified.

To achieve the above object, according to a first aspect of the present invention, there is provided a vibration buffering device mounted between a prime mover and a power transmitting device to transmit power from the prime mover to the power transmitting device. The vibration buffering device comprises a first mass member connected to one of the prime mover and the power transmitting device. A damper housing is mounted in the first mass member and has a passage. The passage is annular about a rotational axis of the first mass member and opens radially inwards of the first mass member. The damper housing also has a plurality of sets of accommodating recesses which are formed into an arcuate shape about the rotational axis and which open into the passage in pairs. A second mass member is connected to the other of the prime mover and the power transmitting device and is capable of being angularly displaced about the same axis relative to the first mass member. A plurality of spring holders are slidably inserted into the passage and have a circumferential length substantially corresponding to a distance between the sets of the accommodating recesses. A plurality of first coil springs are inserted into the passage while being retained on the spring holder, so that opposite ends thereof are in contact with the spring holder in a power non-transmitting state. A plurality of second coil springs are accommodated in the sets of accommodating recesses, respectively, so that opposite ends thereof are in contact with circumferentially opposite ends of the sets of accommodating recesses and circumferentially opposite ends of the spring holder in the power non-transmitting state. A plurality of transmitting arms are placed into the passage, so that the opposite ends of the first coil spring are in contact with the transmitting arms in the power non-transmitting state. The plurality of transmitting arms are coupled to the second mass member and are formed to have a circumferential length smaller than the distance between the sets of the accommodating recesses, so that the transmitting arms can be brought into contact with one ends of the second coil springs in response to the relative rotation of the first and second mass members.

With such an arrangement, in an inoperative state of the prime mover, the opposite ends of each of the second coil springs, which are accommodated in the sets of the pairs of accommodating recesses, are received by the opposite ends of each of the accommodating recesses and are in contact with the opposite ends of each of the spring holders. If a relative angular displacement is produced between the first and second mass members by the operation of the prime mover in this state, each of the transmitting arms is turned relative to the damper housing while compressing each of the first coil springs to come into abutment against one end of each of the second coil springs. During this time, power is transmitted between the first and second mass members while being buffered by the first coil spring. After each of the transmitting arms has been put into abutment against one end of each second coil spring, each transmitting arm compresses the second coil spring in such a manner that the spring holder is slid within the passage with the first coil spring remaining compressed, thereby causing power to be transmitted between the first and second mass members while being buffered by the second coil spring. Thus, in the transmission of power between the prime mover and the power transmitting device, a two-stage vibration buffering characteristic can be provided by the first and second coil springs. Moreover, each of the transmitting arms is formed to have a circumferential length which is smaller than the distance between the sets of the accommodating recesses. Hence, each transmitting arm has a small size. The spring holder may be also of a simple shape and a small size, and can be slid in the passage while retaining the small first coil spring. Further, a conventionally required caulking pin or the like is not required, and a caulking operation or the like is not required, leading to a decreased number of parts and a simplified assembling operation. Thus, the vibration buffering device can be constructed in a lightweight and compact fashion. Moreover, each of the second coil springs is received by the opposite ends of each set of the accommodating recesses in the power non-transmitting state. Hence, even if a preload is applied to the second coil spring, so that movement is not produced, the preload of the second coil spring cannot influence the first coil spring. Thus, it is possible to prevent the generation of a noise due to movement, by applying the preload to the second coil spring so that movement of the second coil spring is not produced.

According to a second aspect of the present invention, in addition to the arrangement of the first aspect of the invention, each of the first coil springs is disposed in a region corresponding to a diameter of the second coil spring in a radial direction of the first mass member. With such an arrangement, it is possible to prevent a force, in a rotational direction, from being applied to the spring holder by the first and second coil springs. Namely, when a point of application of the load from the first coil spring to the spring holder and a point of application of the load from the second coil spring to the spring holder are at locations offset from each other in the radial direction of the first mass member, a force for rotating the spring holder about an axis parallel to the rotational axis of the first mass member is applied from the first and second coil springs to the spring holder. However, since the first coil spring is disposed in the region corresponding to the diameter of the second coil spring in the radial direction of the first mass member, the point of application of the load from the first coil spring to the spring holder exists in the region of the point of application of the load from the second coil spring to the spring holder. Thus, it is possible to prevent the force in the rotational direction from being applied to the spring holder, and to prevent a pinching from being produced within the passage in the damper housing by the spring holder, when the force in the rotational direction is applied to the spring holder.

DESCRIPTION OF THE DRAWINGS

The mode for carrying out the present invention will now be described by way of embodiments shown in the accompanying drawings.

DESCRIPTION OF THE PREFERRED EMBODIMENTS

Figure 1:
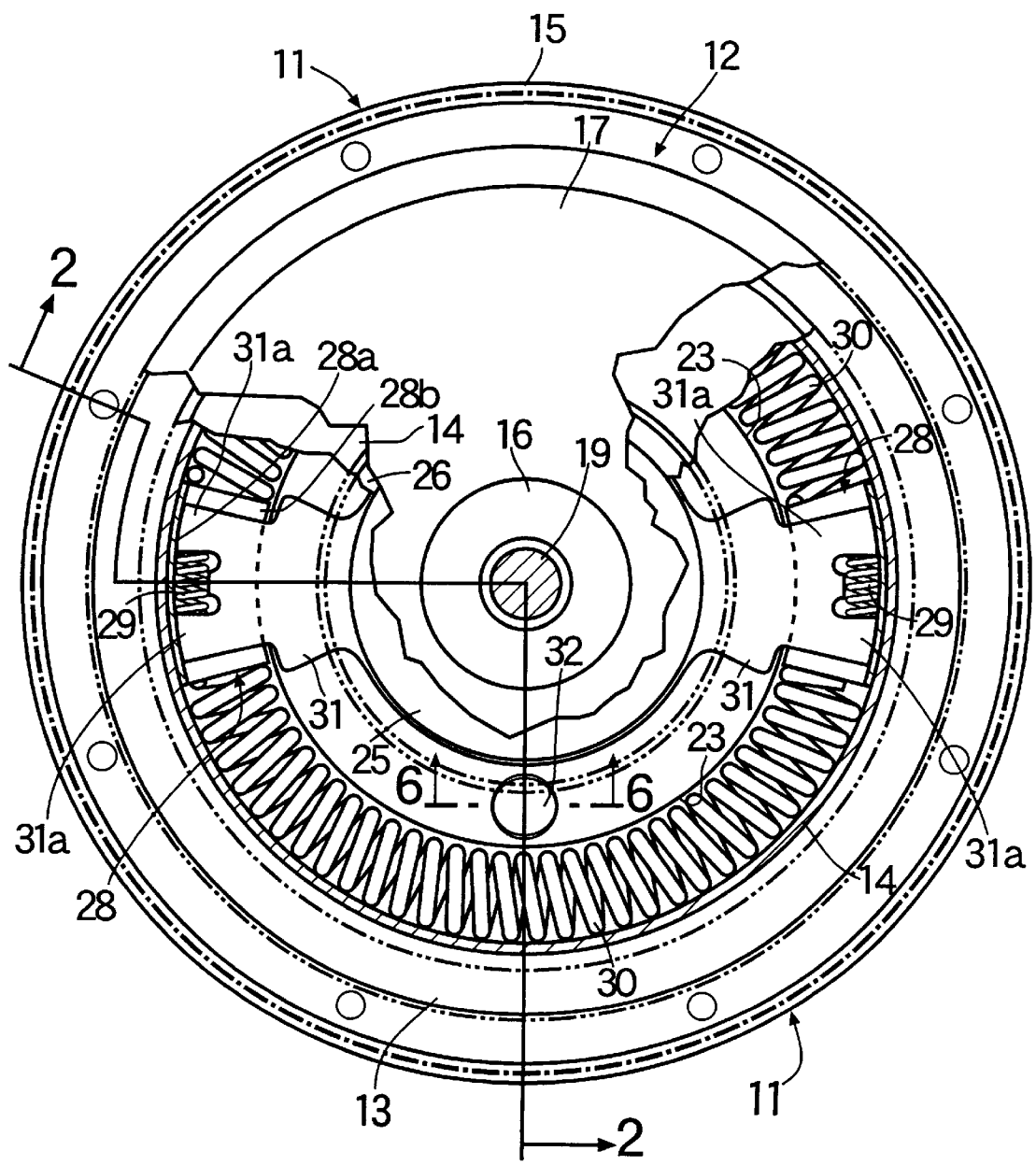
FIG. 1 is a partially cutaway front view of a vibration buffering device according to a first embodiment of the present invention.
Figure 2:
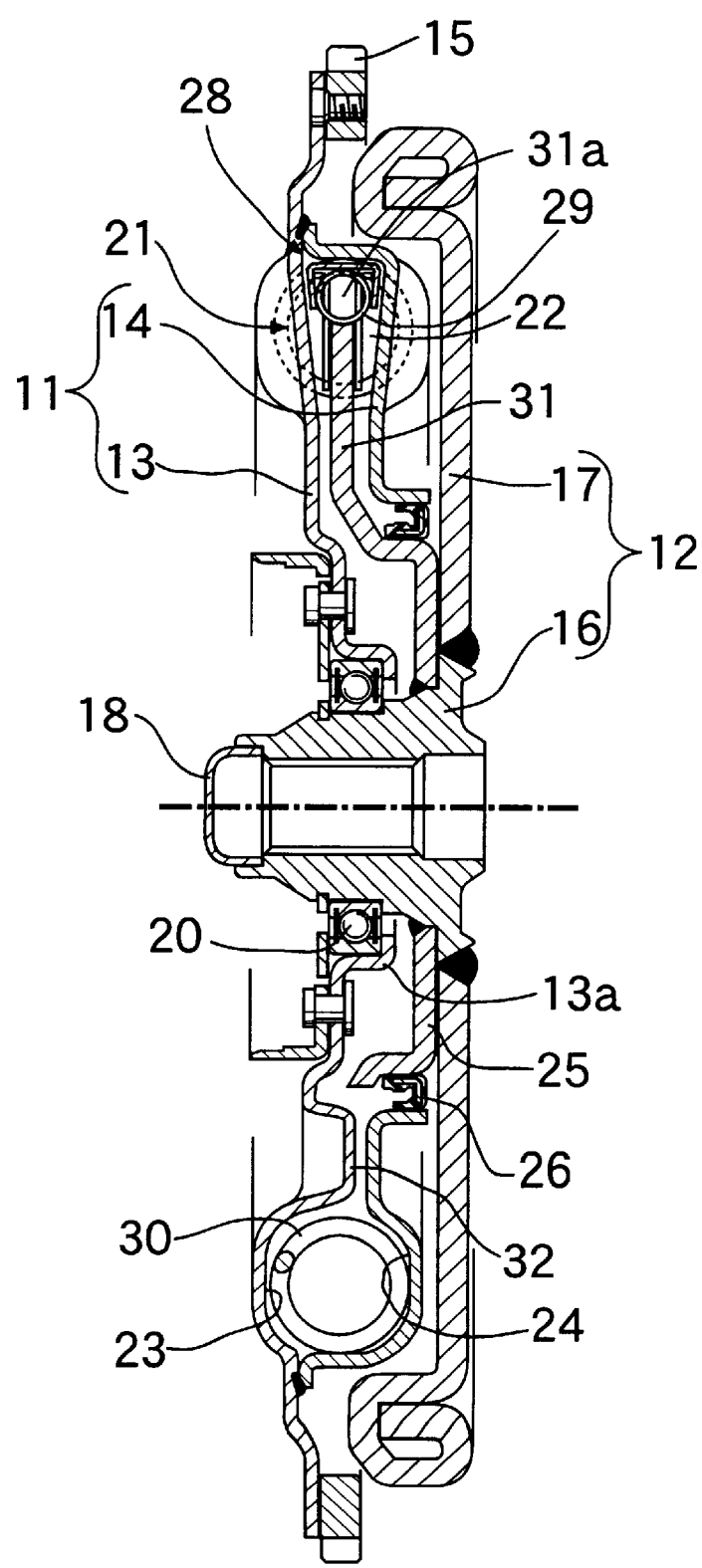
FIG. 2 is a sectional view taken along a line 2—2 in FIG. 1.

Referring first to FIGS. 1 and 2, the vibration buffering system includes first and second mass members 11 and 12 which are capable of being angularly displaced relative to each other about the same axis. A prime mover (not shown) is connected to the first mass member 11 to transmit an output therefrom, and a power transmitting device (not shown) is connected to the second mass member 12.

The first mass member 11 comprises a) a first rotary disk 13 which is formed into a ring plate shape and which has a bearing housing portion 13a in an inner periphery thereof, and b) a cover 14 which is welded to a portion of an inner surface of the first rotary disk 13 near an outer periphery. A gear 15 is coupled to the outer periphery of the first rotary disk 13.

On the other hand, the second mass member 12 comprises a cylindrical rotary shaft 16 having one end coaxially passed through the first rotary disk 13, and a second rotary disk 17 welded to the other end of the rotary shaft 16 to cover the cover 14. A cap 18 is mounted at an opening at one end of the rotary shaft 16. An input shaft 19, of the power transmitting device, is inserted into the rotary shaft 16. The rotary shaft 16 and the input shaft 19 are coupled to each other for non-rotation relative to each other.

A seal bearing 20 is interposed between the first rotary disk 13 in the first mass member 11 and an outer surface of the rotary shaft 16 and is accommodated in the bearing housing portion 13a of the inner periphery of the first rotary disk 13. The first mass member 11 is carried on the rotary shaft 16 through the seal bearing 20 for angular displacement relative to each other. A bearing, which does not have a sealing function, may be accommodated in the bearing housing portion 13a, and a seal member, which is different from the bearing, may be provided between the first rotary disk 13 and the rotary shaft 16.

A damper housing 21 is formed at a portion of the first mass member 11 near the outer periphery thereof by the first rotary disk 13 and the cover 14. An annular passage 22 having a center provided by a rotational axis of the first mass member 11, i.e., a rotational axis of the rotary shaft 16 is defined in the damper housing 21, so that it opens radially inwards of the first mass member 11. Two sets of accommodating recesses 23, 24; 23, 24 (each set forming a pair) are also defined in the damper housing 21 in an arcuate shape about the rotational axis of the first mass member 11.

The set of the accommodating recesses 23 are defined in the inner surface of the first rotary disk 13 into arcuate shapes about the rotational axis of the first mass member 11, so that the recesses 23 are spaced apart through an angle of, for example, about 33 degree from each other. The set of accommodating recesses 24 are defined in the inner surface of the cover 14 in arcuate shapes corresponding to those of the accommodating recesses 23.

A transmitting plate 25 is coupled to the second mass member 12, so that it is superposed on an inner surface of an inner periphery of the second rotary disk 17 in the second mass member 12. An annular seal member 26 is interposed between the inner periphery of the cover 14 in the first mass member 11 and the transmitting plate 25.

The cover 14 and the transmitting plate 25 are sealed therebetween by the seal member 26, and the first rotary disk 13 and the rotary shaft 16 are sealed therebetween by the seal bearing 20, whereby the inside of the damper housing 21 is brought into a sealed state. A viscous fluid is encapsulated in the damper housing 21, so that spring holders 28, first coil springs 29 and second coil springs 30, which will be described hereinafter, are submerged in the viscous fluid.

Figure 3:
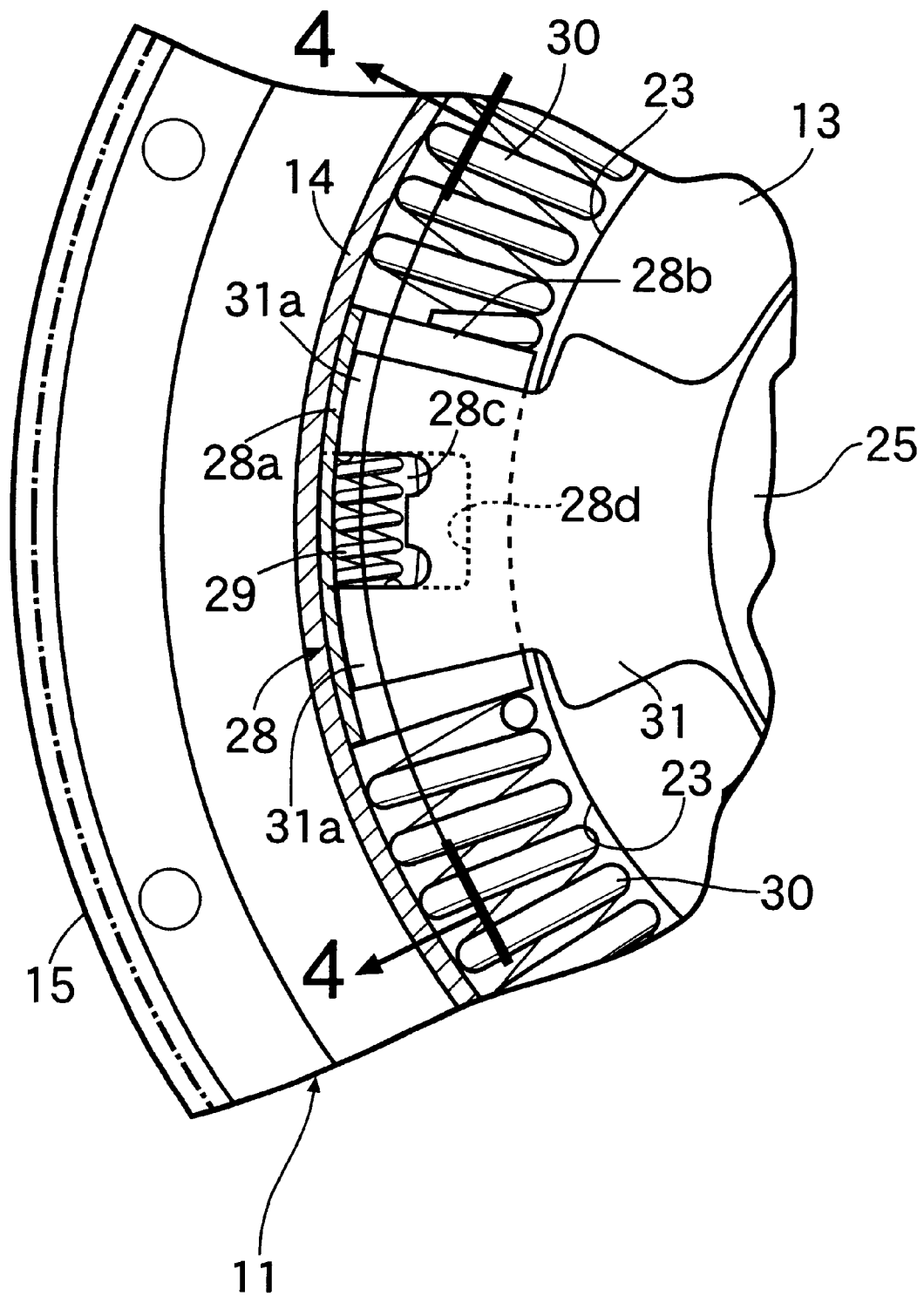
FIG. 3 is an enlarged view of an essential portion shown in FIG. 2.
Figure 4:
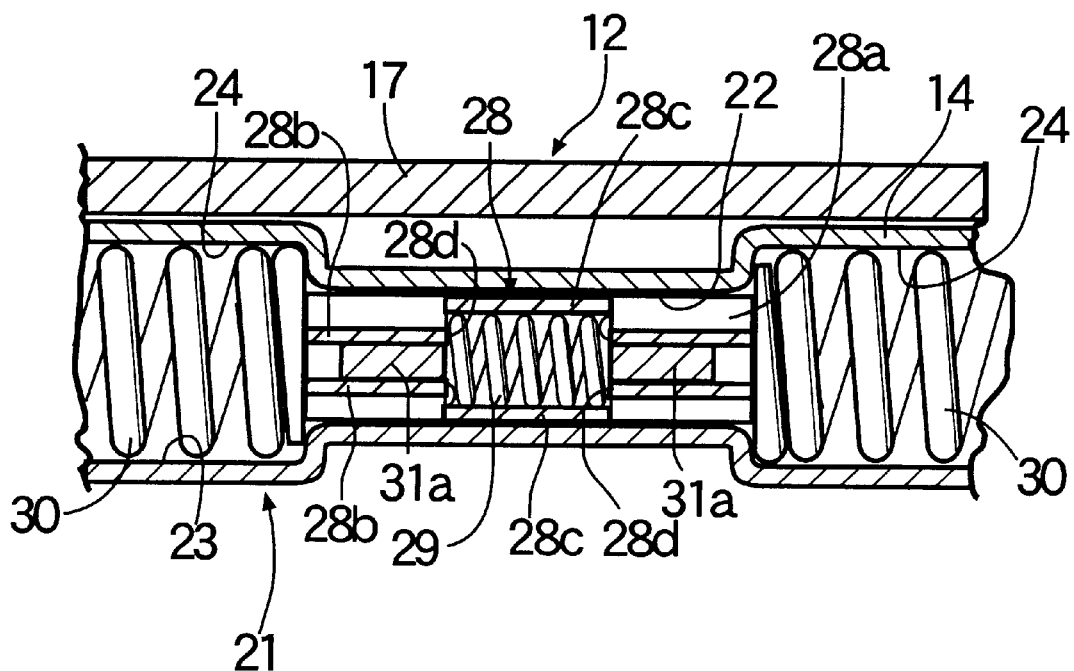
FIG. 4 is a sectional view taken along a line 4—4 in FIG. 3.
Figure 5:
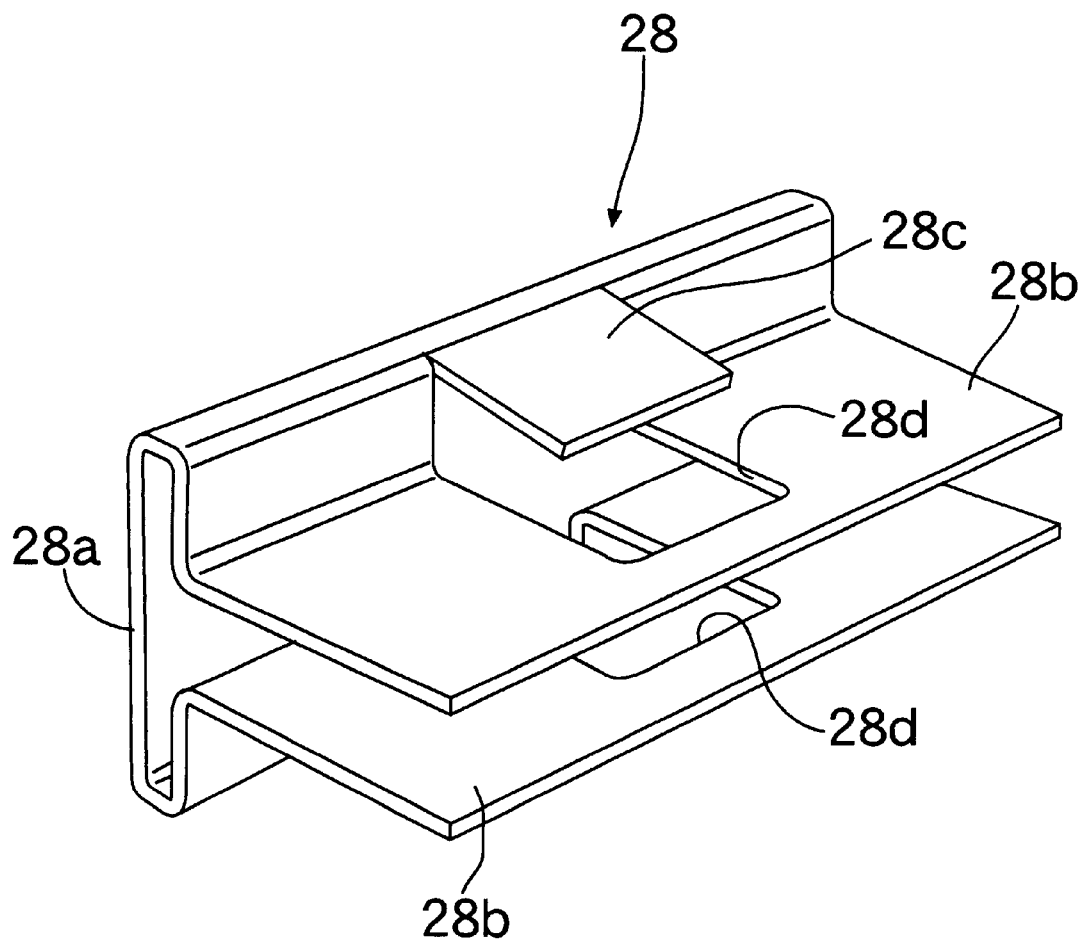
FIG. 5 is a perspective view of a spring holder.

Referring to FIGS. 3, 4 and 5, a pair of spring holders 28 are slidably inserted in the passage 22.

The spring holder 28 is formed, for example, by pressing of a steel plate, and integrally provided with (1) a sliding-contact plate portion 28a which is in sliding contact with an inner surface of an outer periphery of the passage 22, (2) a pair of opposed plate portions 28b connected to the sliding-contact plate portion 28a and opposed to each other at a distance smaller than the width of the passage 22 along the rotational axis of the first mass member 11, and (3) a pair of retaining plate portions 28c which are connected to the sliding-contact plate portion 28a to come into sliding contact with an inner side of the passage 22 which are opposed to each other along the rotational axis of the first mass member 11. The retaining plate portions 28c are connected to a central portion of the sliding-contact plate portion 28a extending in a circumferential direction of the passage 22. Rectangular windows 28d are provided in central portions of the opposed plate portions 28b extending in the circumferential direction of the passage 22. Moreover, the lengths of the sliding-contact plate portion 28a and the opposed plate portions 28b, extending in the circumferential direction of the passage 22, are set substantially in correspondence to the distance between the two sets of the pairs of accommodating recesses 23, 24; 23, 24.

The first coil spring 29 is retained on the spring holders 28. More specifically, the first coil spring 29 is accommodated in both windows 28d in such a manner that it is sandwiched between the pair of retaining plate portions 28c. In a power non-transmitted state, in which there is no relative angular displacement between the first and second mass members 11 and 12, opposite ends of the first coil spring 29 are in contact with opposite ends of each of the windows 28d in the circumferential direction of the passage 22. In this state, a small preload may be applied to the first coil spring 29.

The second coil springs 30, having a larger spring load than that of the first coil spring 29, are accommodated in the two set of the pairs of accommodating recesses 23, 24; 23, 24, respectively. The second coil springs 30 are formed into an arcuate shape about the rotational axes of the mass members 11 and 12. In the power non-transmitted state, the second coil springs 30 are accommodated in the sets of the accommodating recesses 23, 24; 23, 24 in such a manner that their opposite ends are in contact with the opposite ends of the accommodating recesses 23 and 24 and the circumferentially opposite ends of the spring holders 28.

The first coil springs 29 are retained on the spring holders 28, so that they are disposed within a region corresponding to the diameter of the second coil springs 30 in a radial direction of the first mass member 11.

The transmitting plate 25 is integrally provided with a pair of transmitting arms 31 which extend outwards along a diametrical line of the transmitting plate 25. Tip ends of the transmitting arms 31 are placed into the passage 22 in such a manner that they are relatively slidably fitted between the opposed plate portions 28b in the spring holders 28. The lengths of the tip ends of the transmitting arms 31 in the circumferential direction of the passage 22 are set smaller than the distance between the sets of the accommodating recesses 23 and 24. A pair of clamping plate portions 31a are formed at the tip ends of the transmitting arms 31, and bifurcated so that each of them sandwiches corresponding one of the first coil springs 29 retained on the spring holders 28 from opposite sides. In the power non-transmitting state, the opposite ends of the first coil spring 29 are in contact with both the clamping plates 31a, and the clamping plates 31a are at locations spaced apart from the ends of the second coil springs 30.

Figure 6:
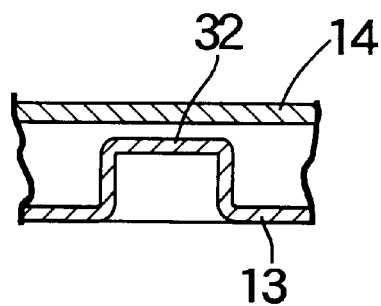
FIG. 6 is an enlarged sectional view taken along a line 6—6 in FIG. 1.

A pair of stoppers 32 are integrally provided in an inward projecting manner on the first rotary disk 13 of the first mass member 11 radially inside each of the sets of the accommodating recesses 23 and 24, so that they are located centrally between the transmitting arms 31 in the circumferential direction in the power non-transmitting state. The stoppers 32 can be put into abutment against the transmitting arms 31 to limit the amount of relative angular displacement of the first and second mass members 11 and 12. The first rotary disk 13 is formed by pressing, and the stoppers 32 are obliged to be formed, so that the diameter of tip ends thereof is slightly smaller. However, as shown in FIG. 6, the radially outer surfaces of the first rotary disk 13 is formed as a surface perpendicular to a direction of rotation of the transmitting arms 31. Thus, it is avoided that a load in an unnecessary direction is applied to the stoppers 32 by the contact of the stoppers 32 with the transmitting arms 31.

The operation of the first embodiment will be described below. In a non-operative state of the prime mover, the opposite ends of each of the second coil springs 30, which are accommodated in each of the sets of the pairs of accommodating recesses 23 and 24, respectively, are received by the opposite ends of each of the sets of the pairs of accommodating recesses 23 and 24, and are in contact with the opposite ends of each of the spring holders 28, as shown in FIGS. 1, 3 and 4. In such a state, if power from the prime mover is transmitted to the first mass member 11 by operation of the prime mover to produce a relative angular displacement between the first and second mass members 11 and 12, the spring holders 28, which are located between the second coil springs 30 having the relatively large spring load, are started to be rotated in response to the rotation of the first mass member 11. This causes the transmitting arms 31, which are integral with the second mass member 12, to be turned relative to the damper housing 21 while compressing the first coil springs 29, so that they are put into abutment against one of the ends of the second coil springs 30. Thus, the power is transmitted between the first and second mass members 11 and 12, while being buffered by the first coil springs 29.

After the transmitting arms 31 have been put into abutment against one of the ends of the second coil springs 30, the transmitting arms 31 compress the second coil springs 30 with the first coil springs 29 remaining compressed, so that the spring holders 28 are slid within the passage 22. Thus, the power is transmitted between the first and second mass members 11 and 12, while the vibration is being buffered by the second coil springs 30. Namely, in the transmission of the power between the prime mover and the power transmitting device, a two-stage vibration buffering characteristic can be provided by the first and second coil springs 29 and 30.

Further, when the second coil springs 30 have been compressed to the maximum, the transmitting arms 31 are put into abutment against the stoppers 32, respectively, whereby the first and second mass members 11 and 12 are rotated in unison with each other. Thus, it is possible to avoid applying an excessive load to the second coil springs 30.

In such a vibration buffering device, each of the transmitting arms 31 is formed to have a circumferential length smaller than the distance between the sets of the accommodating recesses 23 and 24 and thus, has a small size. Each of the spring holders 28 may be also of a simple shape and a small size, such that it can be slid in the passage 22, while retaining the small first coil spring 29. Therefore, a conventionally required caulking pin or the like is not required, and a caulking operation is not required, either, leading to a decreased number of parts and a simplified assembling operation. Thus, the vibration buffering device can be constructed in a lightweight and compact fashion.

Moreover, each of the second coil springs 30 is received by the opposite ends of each set of the accommodating recesses 23 and 24 in the power non-transmitting state. Even if a preload is applied to the second coil springs 30, so that movement is not produced, the preload on the second coil springs 30 cannot influence the first coil springs 29. Therefore, it is possible to prevent the generation of a noise due to movement by applying the preload to the second coil springs 30, so that movement is not produced in the second coil springs 30.

In addition, since the first coil springs 29 are disposed in the region corresponding to the diameter of the second coil springs 30 in the radial direction of the first mass member 11, it is possible to prevent a force in the rotational direction from being applied to the spring holder 28 by the first and second coil springs 29 and 30. When a point of application of the load from the first coil spring 29 to the spring holder 28 and a point of application of the load from the second coil spring 30 to the spring holder 28 are at locations offset from each other in the radial direction of the first mass member 11, a force for rotating the spring holder 28 about an axis parallel to the rotational axis of the first mass member 11 is applied from the first and second coil springs 29 and 30 to the spring holder 28. However, the point of application of the load from the first coil spring 29 to the spring holder 28 exists in an area of the point of application of the load from the second coil spring 30 to the spring holder 28 since the first coil springs 29 are disposed in the region corresponding to the diameter of the second coil springs 30 in the radial direction of the first mass member 11. Thus, it is possible to prevent the force in the rotational direction from being applied to the spring holder 28, and to prevent a pinching from being produced by the rotation of the spring holder 28 within the passage 22 in the damper housing 21.

Further, since the stoppers 32 for inhibiting the relative rotation of the mass members 11 and 12 are provided on the first rotary disk 13 of the first mass member 11 radially inside the sets of the accommodating recesses 23 and 24, the stoppers 32 are disposed by effectively utilizing an unoccupied space produced inside an area where the first and second coil springs 29 and 30 are disposed. Thus, the first and second coil springs 29 and 30 can be disposed at a required distance radially toward the outside of the mass members 11 and 12. Moreover, in the vibration buffering device of the type (in Japanese Patent Application Laid-open No. 7-71526) in which the plurality of second coil springs are disposed outside the first coil springs in the radial direction of the first and second mass members 11 and 12, stoppers individually corresponding to the first and second coil springs are required. In the arrangement according to the present invention in which the first and second coil springs 29 and 30 are urged by the transmitting arm 31, however, the stoppers 32 common to the first and second coil springs 29 and 30 will be enough, whereby the structure of the first mass member 11 can be further simplified.

Figure 7:
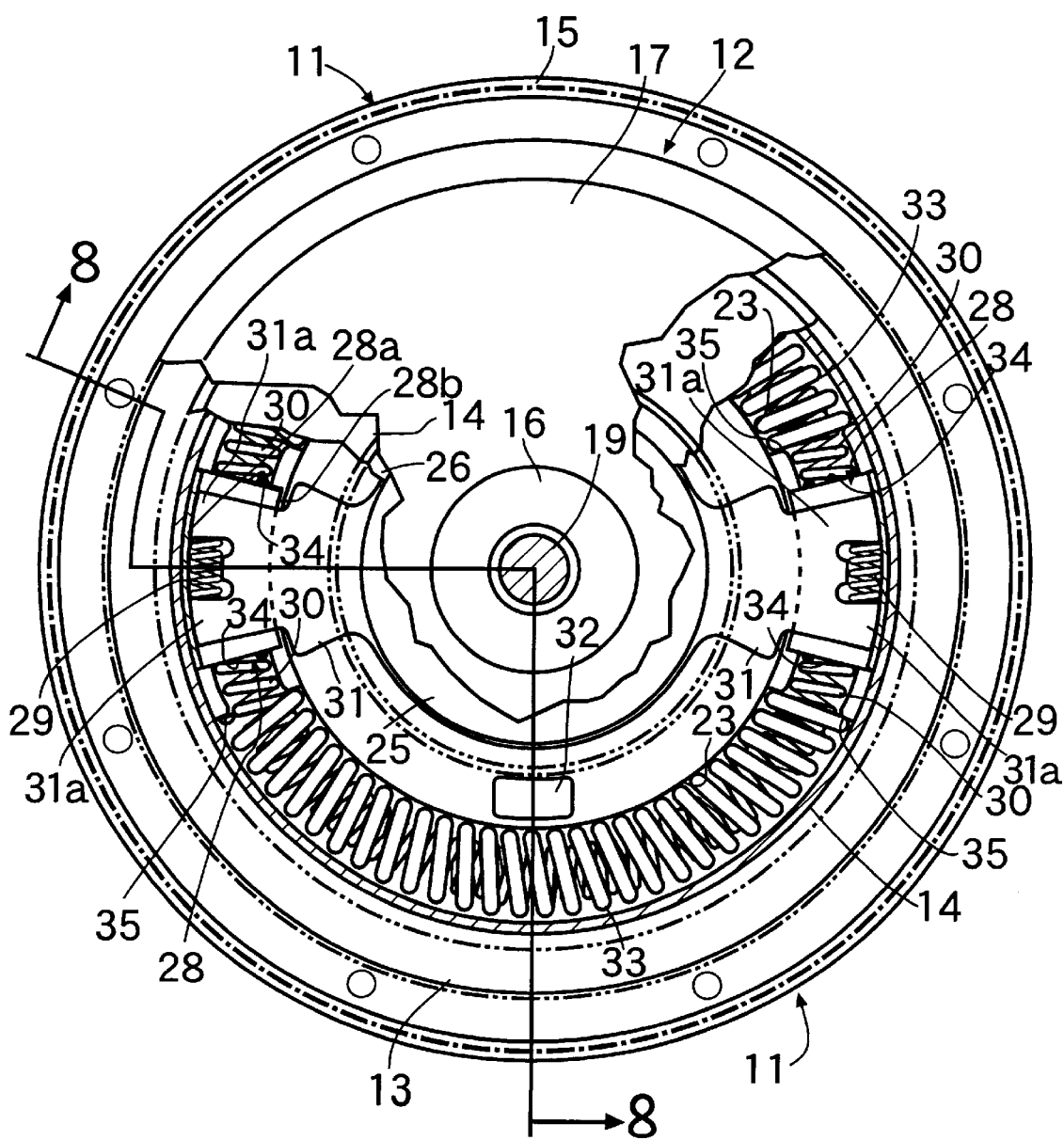
FIG. 7 is a partially cutaway front view of a vibration buffering device according to a second embodiment of the present invention.
Figure 8:
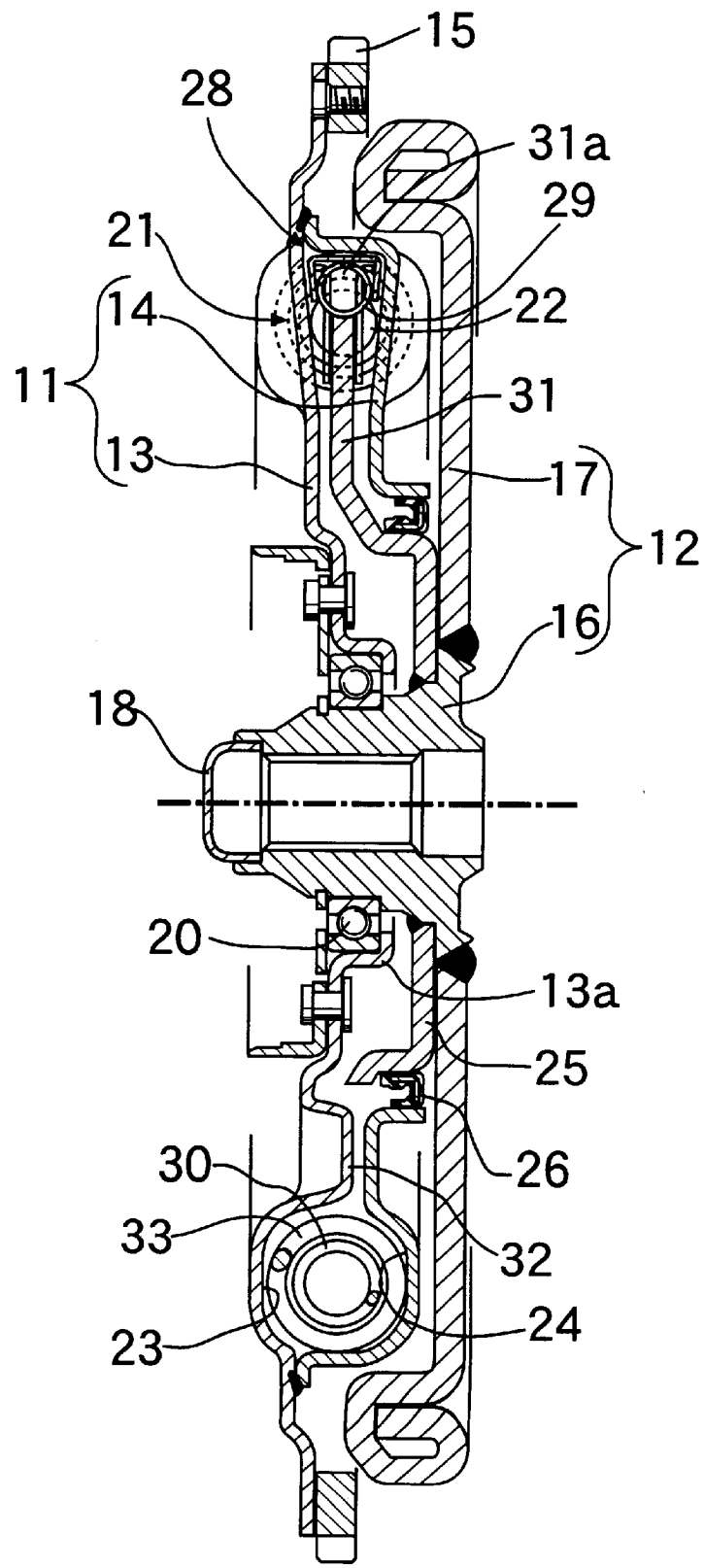
FIG. 8 is a sectional view taken along a line 8—8 in FIG. 7.

FIG. 7 is a partially cutaway front view of a vibration buffering device according to a second embodiment of the present invention, and FIG. 8 is a sectional view taken along a line 8—8 in FIG. 7, wherein portions or components corresponding to those in the first embodiment are designated by like reference characters.

The damper housing 21 is provided at a portion of a first mass member 11 near the outer periphery thereof, and has an annular passage 22 which opens radially inwards of the first mass member 11 and two sets of pairs of accommodating recesses 23 and 24. The second coil springs 30 and third coil springs 33, concentrically surrounding the second coil springs 30, are accommodated as concentric double layers in the respective sets of accommodating recesses 23 and 24. The spring load of the third coil springs 33 is set larger than that of the second coil spring 30.

The length of the second coil spring 30 in a circumferential direction of the passage 22 is larger than the length of the third coil springs 33. Each of the sets of accommodating recesses 23 and 24 is formed, at opposite ends thereof, with first receiving portions 34 for receiving opposite ends of each of the second coil springs 30 in the power non-transmitting state, and second receiving portions 35 disposed inside the first receiving portions 34 in the circumferential direction of the passage 22 for receiving opposite ends of each of the third coil springs 33 in the power non-transmitting state.

In the power non-transmitting state, the opposite ends of the spring holders 28 for retaining the first coil springs 29 are in contact with the opposite ends of the second coil springs 30. When a relative angular displacement is produced between both the mass members 11 and 12, one of the ends of the third coil springs 33 is brought into contact with the transmitting arms 31 subsequent to the contact of one of the ends of the second coil springs 30 with the transmitting arms 31.

With the second embodiment, after a two-stage buffering characteristic is obtained by the first and second coil springs 29 and 30, the transmitting arms 31 are put into abutment against one of the ends of the third coil springs 33 to compress the third coil springs 33. Therefore, a three-stage buffering characteristic can be obtained.

Although each of the embodiments has been described about where the first mass member 11 is connected to the prime mover and the second mass member 12 is connected to the power transmitting device, the first mass member 11 may be connected to the power transmitting device, and the second mass member 12 may be connected to the prime mover.

As discussed above, according to a first embodiment of the present invention, in the transmission of the power between the prime mover and the power transmitting device, a two-stage vibration buffering characteristic can be provided by the first and second coil springs. In addition, each of the transmitting arms is formed to have the circumferential length smaller than the distance between the sets of the accommodating recesses and hence, is of a small size. The spring holder also may be of a simple shape and a small size, and can be slid in the passage while retaining the smaller first coil spring. Therefore, the vibration buffering device can be constructed in a lightweight and compact fashion, the number of parts can be reduced, and the assembling operation can be simplified. Further, a preload can be applied to the second coil spring, so that the movement of the second coil spring is not produced, while avoiding the influence to the first coil spring. Thus, it is possible to prevent the generation of a noise due to the movement.

According to a second embodiment of the present invention, it is possible to prevent the force in the rotational direction from being applied to the spring holder by the first and second coil springs, and to prevent pinching from being produced within the passage in the damper housing by the spring holder.

Although the embodiments of the present invention have been described in detail, it will be understood that the present invention is not limited to the above-described embodiments, and various modifications in design may be made without departing from the spirit and scope of the invention defined in the claims.

What is claimed is:

1. A vibration buffering device mounted between a prime mover and a power transmitting device to be able to transmit a power from the prime mover to the power transmitting device, said vibration buffering device comprising:

a first mass member connected to one of the prime mover and the power transmitting device;

a damper housing mounted in said first mass member and having a passage which is annular about a rotational axis of said first mass member and which opens radially inwards of said first mass member, and said damper housing having a plurality of sets of accommodating recesses which are formed into an arcuate shape about said rotational axis and which open into said passage in pairs;

a second mass member connected to the other of the prime mover and the power transmitting device and capable of being angularly displaced about the same axis relative to said first mass member;

a plurality of spring holders which are slidably inserted into said passage and which have a circumferential length substantially corresponding to a distance between said sets of the accommodating recesses;

a plurality of first coil springs wherein each first coil spring of said plurality of first coil springs is inserted into said passage while being retained on a spring holder, so that opposite ends thereof are in contact with said spring holder of said plurality of spring holders in a power non-transmitting state;

a plurality of second coil springs accommodated in the sets of accommodating recesses, respectively, so that opposite ends thereof are in contact with a) circumferentially opposite ends of the sets of accommodating recesses and b) circumferentially opposite ends of said spring holder in the power non-transmitting state; and a plurality of transmitting arms which are placed into said passage, so that the opposite ends of said first coil spring are in contact with said transmitting arms in the power non-transmitting state, and said plurality of transmitting arms are coupled to said second mass member and formed to have a circumferential length smaller than the distance between said sets of the accommodating recesses, so that said plurality of transmitting arms are brought into contact with one of the ends of said second coil springs in response to the relative rotation of said first and second mass members.

2. A vibration buffering device according to claim 1, wherein each of said first coil springs is disposed in a region corresponding to a diameter of said second coil springs in a radial direction of said first mass member.

3. A vibrating buffering device according to claim 1, further comprising third coil springs, wherein said second and third coil springs are accommodated in concentric double layers in the respective sets of accommodating recesses.

4. A vibrating buffering device according to claim 3, wherein a spring load of the third coil springs is larger than a spring load of the second coil springs.

5. A vibrating buffering device according to claim 4, wherein a length of the second coil springs in a circumferential direction of the passage is larger than a length of the third coil springs.

6. A vibrating buffering device according to claim 1, further comprising stoppers provided on said first mass member radially inside each of the sets of accommodating recesses and centrally between the transmitting arms in the circumferential direction in a power non-transmitting state.

* * * * *